United States Patent [19]

Stillman, Jr.

[11] 4,023,184

[45] May 10, 1977

[54] THERMAL MATRIX TYPE PRINTING HEAD

[75] Inventor: Stephen L. Stillman, Jr., Nashua, N.H.

[73] Assignee: MFE Corporation, Salem, N.H.

[22] Filed: Oct. 6, 1975

[21] Appl. No.: 619,589

[52] U.S. Cl. .......................... 346/76 R; 346/139 C

[51] Int. Cl.$^2$ ........................................ G01D 15/10

[58] Field of Search ......... 346/76 R, 139 C, 74 SB; 219/216

[56] References Cited

UNITED STATES PATENTS

| | | | |
|---|---|---|---|
| 3,161,457 | 12/1964 | Schroeder et al. | 346/76 R |
| 3,340,381 | 9/1967 | Best | 346/76 R X |
| 3,453,647 | 7/1969 | Bernstein et al. | 346/76 R |
| 3,478,191 | 11/1969 | Johnson et al. | 219/216 |
| 3,578,946 | 5/1971 | Colello | 219/216 |
| 3,715,564 | 2/1973 | Hiruma et al. | 219/216 |
| 3,789,423 | 1/1974 | Fawcett | 346/76 R |
| 3,814,897 | 6/1974 | Otani et al. | 219/216 |
| 3,907,090 | 9/1975 | Northfield et al. | 346/76 R X |

*Primary Examiner*—George H. Miller, Jr.

*Attorney, Agent, or Firm*—Cesari and McKenna

[57] ABSTRACT

A printer for recording images on thermally sensitive paper. It includes a head that comprises a set of longitudinally extending fingers comprising laminated highly conductive and resistive heating layers. Gaps in the electrically conductive layers traverse the fingers to form discrete printing areas in the resistive layers. An electrical current selectively passed through a finger heats the printing area therein and thereby records a dot image at a corresponding portion of the paper.

9 Claims, 3 Drawing Figures

THERMAL MATRIX TYPE PRINTING HEAD

FIELD OF THE INVENTION

This invention relates, in general, to thermal printing systems and, more specifically, to a novel thermal printing head.

DESCRIPTION OF THE PRIOR ART

Thermal printers are known in the art, a typical one being described by Johnson et al in U.S. Pat. No. 3,478,191. Such printers include printing heads with discrete printing elements mounted on a common substrate for mechanical support. Electrical conductors individually attach to each printing element to supply energizing current thereto in response to printing signals.

These printers are used to record alphanumeric characters or other symbols on recording media in the form of tapes or webs. In a typical operation, a heat sensitive tape moves past the printing head. Printing signals produce electric currents in selected ones of the thermal elements on the head to heat those elements and thereby thermally "print" a desired symbol on the tape.

In one type of head the thermal elements are segments arranged, for example, in the conventional seven-segment bar code array. Selective heating of the bar-like segments thus provides printing of the ten numerals and certain letters and other symbols. In another head the thermal elements are dot-like instead of segmented and they are arranged in a matrix, such as the familiar 5 × 7 dot matrix. By selectively heating these elements, one may print a combination of dots forming any desired symbol.

A third type of thermal printing head comprises a single column of dot-like thermal printing elements. The elements are selectively energized as the tape moves past, thus printing symbols in a two-dimensional dot matrix by printing, in succession, closely spaced columns. It is this type of printer to which the present invention is specifically directed.

In general, the thermal elements in all these types of printing heads are supported on a substrate, either directly or with an intermediate layer of supportive material. These supporting substrates, in some cases, detract from the desired thermal properties of the printing element. For example, fast thermal response and high electric efficiency are two desirable properties which are not achieved with the prior printing heads.

A related problem with these prior thermal printing heads results from a limitation in the peak temperature to which the printing elements may be heated. This limitation is imposed by the potentially destructive effect of high temperatures on the printing elements. Wax or other materials on the tape may coat the printing elements and thereby thermally insulate the head. The coating thus reduces the heat transfer rate from the printing head to the tape and thereby deteriorates the quality of the printed symbols. Moreover, the retained heat may elevate the temperature of the printing head until the elements are destroyed.

Consequently, it is an object of this invention to provide an improved thermal printing head.

Another object of this invention is to provide a heating element with a fast thermal response.

Still another object of this invention is to provide a thermal printing head which may be heated to a temperature which minimizes the formation of coatings of wax or like materials on the printing elements.

Yet another object of this invention is to provide an economical and reliable thermal printing head.

SUMMARY OF THE INVENTION

In accordance with this invention, a thermal printing head comprises discrete printing elements which are individually energized to print dot matrix symbols on a thermally sensitive recording medium. Each element has an electrically resistive printing area supported solely by a pair of highly electrically conductive leads that conduct current to and from the printing area. In the preferred embodiment of the invention I achieve this arrangement with a laminated plate formed from an electrically conductive layer and highly resistive layer. A gap in the conductive layer defines the printing area in the resistive layer, which is supported at each end by leads formed in the conductive material. The thermally sensitive recording medium contacts the printing area thereby to mark it in response to a printing signal that passes a current through the printing area and heats it.

This invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

Figure 1:
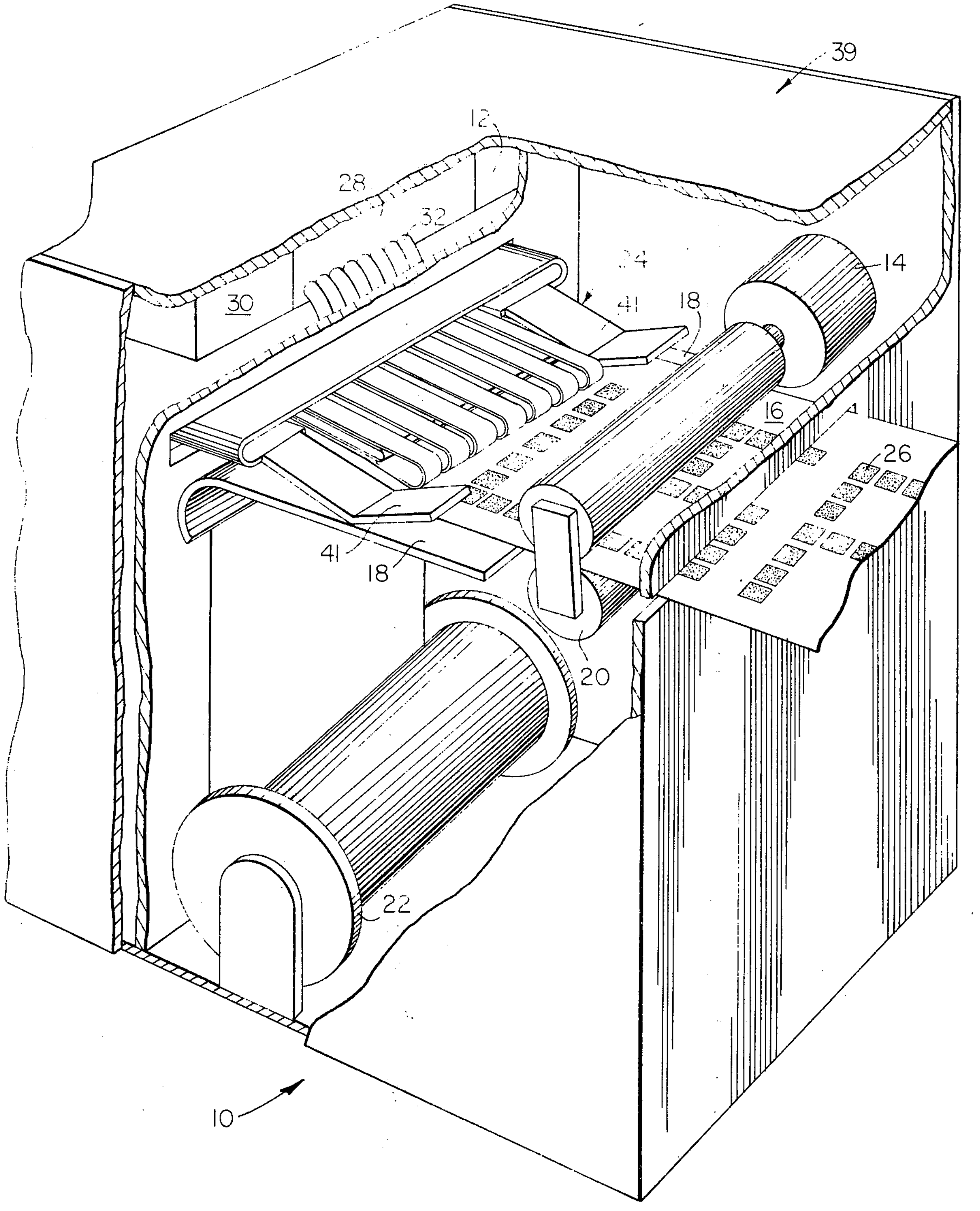
FIG. 1 shows a strip chart recorder using a printing head constructed in accordance with the present invention.

Referring to FIG. 1, a printer 10 constructed in accordance with this invention includes a power supply 12 which energizes a drive motor 14, thereby to transport a thermally sensitive tape 16 across a writing table 18. The drive motor 14 rotates feed rollers 20 to pull the tape 16 from a supply spool 22 past a printing head 24 which forms symbols on the tape 16, such as those shown in dot-matrix form and designated by reference numeral 26. A printing control unit 28 selectively directs current pulses from a pulse generator 30 to individual printer elements in the head 24 over a multiple-conductor cable 32. The current pulses act as printing signals.

Printing areas formed in the printing elements in the head 24 are heated by the current pulses. Portions of each printing area contact the tape 16 so that each pulse conveyed to a printing element products a dot at a corresponding portion on the tape.

A printer housing 39 supports all the foregoing parts.

The control unit 28 is adapted to receive signals, usually in digital form, which correspond to a character to be printed. Conventional circuitry in the control unit 28 converts each set of character signals into a sequence of printing signals. The printing signals, in turn, energize the printing head 24 to control the sequence in which individual dots are printed on the tape 16 in each of the successive columns in the complete character matrix.

In one specific embodiment the pulse generator 30, and printing control unit 28 are constructed so that each row in a column is energized by the printing signals sequentially, rather than simultaneously. This reduces the peak current from the pulse generator 30 to the current necessary to energize only one printing area (i.e., form one dot) thereby simplifying the pulse generator design and reducing its cost. The printing head may be skewed to compensate for the sequential nature of the printing signals thereby to produce "vertical" columns.

Figure 2:
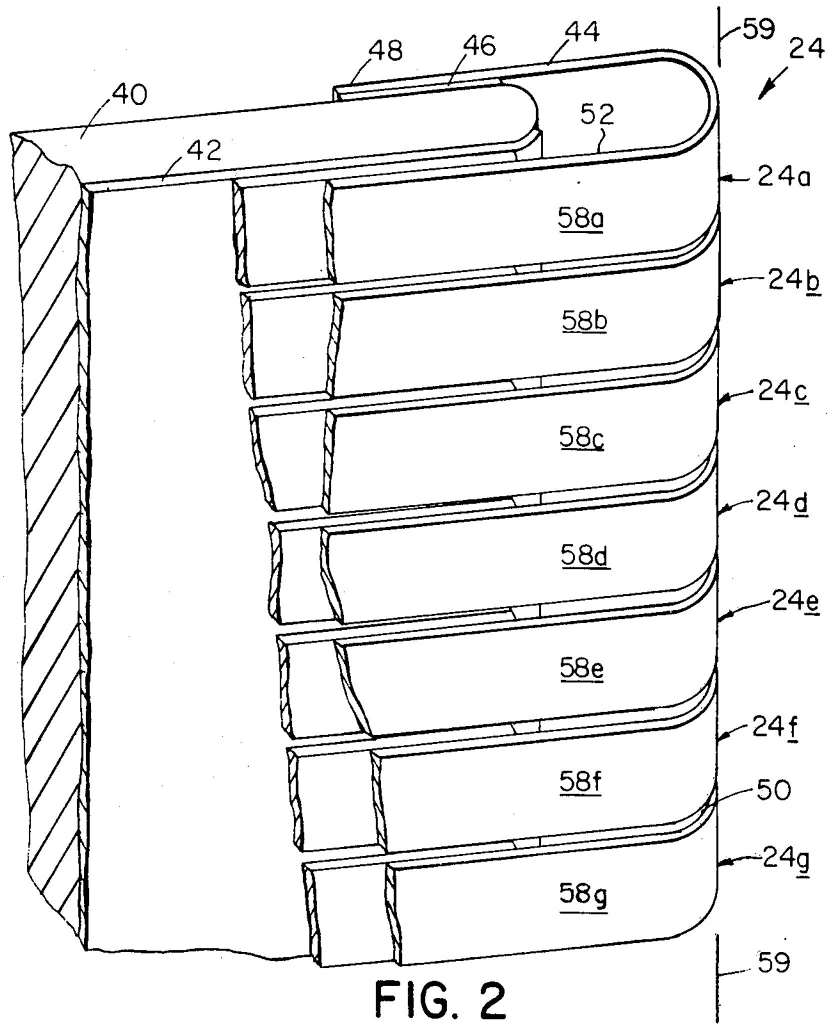
FIG. 2 is a detailed perspective view of the printing head shown in FIG. 1.

As shown in FIG. 2, the printing head 24 comprises a supporting plate 40 of spring steel or other material. Although not shown in FIG. 2, the plate 40 mechanically supports the cable 32 in FIG. 1. In addition, the plate 40 may have integral elements 41 (shown in FIG. 1) to properly position the printing head 24 with respect to the table 18 and to hold down the tape 16 or to guide the tape 16 past the head 24. If the plate 40 is formed of spring steel or other conductive material, it is covered on one side with one or more layers of an electrically insulating film 42 adapted for high temperature environments. One such film is a polyimide film manufactured and sold by DuPont as "Kapton" film.

Figure 3:
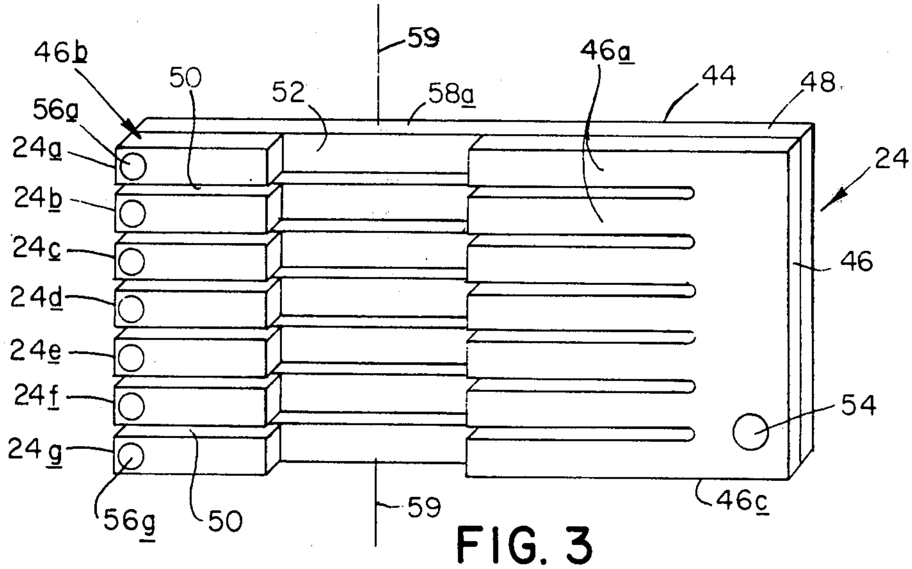
FIG. 3 is a view of a plate which is used to form the part of the printing head shown in FIG. 2.

Referring to FIGS. 2 and 3, the printing head 24 includes printing elements of fingers **24*a* through 24*g* formed in a laminated plate 44 comprising a conductive layer 46 normally a low resistance metal such as copper, and a layer 48 of highly resistive heating material, such as a nickle-chromium alloy. The individual fingers are formed by chemically etching or mechanically cutting a number of longitudinal slots 50 in the plate 44. A selected portion of the copper layer 46 is removed in each of the printing elements 24*a* through 24*g* to form gaps 52 in the conductive layer on each finger. This may be done by chemical or mechanical methods. The gap 52, which forms two longitudinally spaced portions 46*a* and 46*b* of conductive material in each of the printing elements, are aligned as shown. The spaced portions 46*a* and 46*b*** thereby form conductive leads.

As shown in FIG. 3, there is a common portion **46*c* in the conductive layer 46 adjoining the conductive portions 46*a*. This portion 46*c* is affixed directly to the plate 40 and has a terminal 54 to receive a common, or return, conductor in the cable 32 (FIG. 1). Another cable terminal 56*a* is at the far end of the element 24*a*. Likewise, each of the remaining elements 24*b* through 24*g* contain terminals 56 for other conductors in the cable 32. With this construction, a current pulse directed over the conductor in the cable 32 connected to printing element 24*a*, passes through the return conductor connected to the common terminal 54**.

In the elements **24*a* through 24*g* the copper conductive portions, leads, 46*a* and 46*b* "shunt" the underlying parts of the resistive layer except at the gap 52. In the printing element 24*a*, the resistive layer at the gap 52 defines a coextensive printing area. As there is no "shunt" at the gap 52, current must pass through the printing resistive layer which forms the area 58*a* thereby heating that portion of layer 44**. This produces a dot on the corresponding abutting portion of the thermally sensitive tape.

Referring back to FIG. 2, the plate 44 is bend into a generally "U" shape along an axis 59 (FIGS. 2 and 3) and affixed to the plate 40. The elements **24*c* through 24*g* are mounted to the insulating film 42. The conductive layer 46 lies on the inside of the "U" while the resistive layer forms an external surface which bears against the tape. The plate 40 and plate 44 are oriented with respect to each other and with respect to the writing table 18 in FIG. 1 so that portions of the printing areas 58*a* through 58*g*** on the U-shaped printing head touch the tape.

In operation, current pulses pass to selected ones of the printing elements **24*a*** through 24*g* in predetermined sequences which depend upon the symbol to be printed. As each pulse passes through the corresponding printing element, it heats only the resistive material at the printing area as the copper or conductive layer acts as an electrical shunt in all other areas of that element. Thus, the printing areas are heated and they produce dots on the tape in the sequence which produces the desired character or symbol.

In summary, the printing head 24 shown in FIG. 2, contains a plurality of printing areas formed in a laminated plate composed of conductive and resistive layers. Although the leads in each of the printing elements 24 are thereby mounted on a supporting member composed of the supporting plate 40 in FIG. 2, there is no supporting substrate for the printing areas 58 in the sense of prior thermal printing heads. That is, the printing areas 58 are spaced from their respective supporting members, i.e., at the ends of the conductive portions. They do not contact them, either directly or by way of an intervening layer of material. Rather, heat conduction from the printing areas 58 takes place almost exclusively into the recording paper and along the electrical leads.

During the interval after a printing element is energized, the air behind the resistive layer 44 in the gap 52 is a comparatively poor thermal conductor and thus minimizes the heat losses, so the temperature in the printing area rises rapidly. Furthermore, as there is no substrate at the printing area, the printing area may be heated to a temperature which burns wax or other contaminants thereby minimizing material build-up problems. Once the printing signal terminates, however, the conductive layer 46 transfers the heat away from the printing area rapidly so that the temperature falls rapidly. The combination of rapid temperature rise and fall is a characteristic that exists because the thermal mass is small. This characteristic enables a more distinct dot to be printed on the paper for a given paper speed past the printing head 24. Thus, the printing is sharply delineated.

The foregoing discussion describes a particular construction for the printing head and for the printer which uses it. However, the printing head may comprise a plate with two or more laminations of different materials and may be configured differently. Different structures may replace the illustrated plate 40 and film 42 which are shown. The printing areas **58*a* through 58*g* may be of any configuration, as may the leads be. Moreover, the printing areas may be arranged in any desired array. While FIG. 1 shows a fixed head, it will be apparent that the printing head 24 can be combined with a carriage or other drive means to provide a moving head assembly thereby to enable a print to form multiple lines on the tape 16**.

Thus, it is the intent of the appended claims to cover all such variations and modifications which come within the true spirit and scope of this invention.

What I claim as new and desire to secure by Letters Patent of the U.S. is:

1. A thermal printing head for recording information on a thermally sensitive recording medium in response to intermittent electrical printing signals, said printing head comprising:

A. a plurality of spaced printing elements, each said element including:

i. first and second spaced, electrically conductive leads forming a gap therebetween and constituting a support for said elements, and ii. an electrically resistive heating layer including end portions adjoining portions of said first and second leads and a central portion spanning the gap thereby to be supported solely by said leads, said central portion including a printing area for contacting the medium.

B. means for supporting said leads thereby to orient said printing areas in a predetermined array, said supporting means being spaced from said printing areas thereby to form an air space between said support means and the central portions of said printing elements, and C. means for coupling selectively the intermittent printing signals to said leads in said printing elements to energize selectively each said printing element thereby to heat said resistive material in the gap and mark that portion of the recording medium that then contacts said printing area.

2. A thermal printing head as recited in claim 1 wherein said supporting means comprises:

i. a conductive member adjoining and supporting said first leads, and ii. insulating means between said supporting means and said second leads, said supporting means thereby supporting said second leads.

3. A thermal printing element for recording information on a thermally sensitive recording medium in response to intermittent electrical printing signals, said printing element comprising:

A. a longitudinally extending, laminated plate including an electrically resistive heating layer and an electrically conductive layer, said conductive layer having first and second longitudinally spaced portions thereby to form a transverse gap in the conductive layer and to form in said resistive layer a central portion that includes a printing area for contacting the recording medium, B. a support for said plate, said conductive layers being affixed to said support and spacing said printing area from said support thereby to form an air space between said support and said central portion, and C. means connected to said first and second electrically conductive portions for coupling the printing signals to said printing element to energize said printing element and heat said resistive material in said gap thereby to mark that portion of the recording medium that then contacts said printing area.

4. A thermal printing element as recited in claim 3 wherein said plate comprises a plurality of longitudinally extending, transversely spaced fingers, said gap in said conductive layer traversing said fingers thereby to form a discrete printing area on each finger.

5. A thermal printing element as recited in claim 3 wherein said plate is formed with a reverse bend about a transverse axis in a substantially U-shaped configuration with first and second leg portions, said conductive layer being faced toward said axis and said printing areas being aligned on the outer surface.

6. A printer for forming symbols on a thermally sensitive printable medium, said printer comprising:

A. a housing with a writing table,

B. means mounted to said housing for moving the printable medium over said writing table, C. means for transmitting intermittently printing signals corresponding to a symbol to be formed on the printable medium, and D. a printing head responsive to the printing signals and mounted to said housing to heat selected portions of the printable medium thereby to form the desired symbol, said printing head including:

i. a longitudinally extending laminated plate including an electrically resistive heating layer and an electrically conductive layer formed into a plurality of longitudinally extending, transversely spaced fingers, said conductive layer having first and second longitudinally spaced portions on each finger thereby to form a transverse gap in the conductive layer and to form in said resistive layer a coextensive central portion that includes a printing area at each said finger that contacts the printable medium, and said fingers having means for coupling the printing signals to said conductive portions thereby to heat said resistive material at said printing area and to mark that portion of the printable medium that then contacts said printing area, and ii. a support for said plate, said conductive layer being affixed to said support and spacing said printing area from said support thereby to form an air space between said support and said central portion of said resistive layer.

7. A printer as recited in claim 6 wherein said plate is formed with a reverse bend about a transverse axis which is substantially parallel with the printable medium thereby to produce a substantially U-shaped configuration with first and second leg portions, said conductive layer being faced toward said axis and said printing areas being aligned on the outer surface of said leg portion contiguous to the printable medium thereby to contact it.

8. A printer as recited in claim 6 wherein said plate includes a base portion from which said fingers extend and said first conductive portion overlies said base portion and the contiguous portions of said fingers.

9. A printer as recited in claim 8 wherein said printing signal transmitting means includes a plurality of conductors corresponding to each finger and a return condctor, said common return conductor being connected to said first conductive portion and the other conductors being individually connected to the second conductive portions in corresponding ones of said fingers.

* * * * *